March 9, 1971     G. J. WICKSALL     3,568,370
LENS CRIBBER

Filed Nov. 12, 1968     5 Sheets-Sheet 2

INVENTOR.
GUY J. WICKSALL
BY
ATTORNEY

March 9, 1971     G. J. WICKSALL     3,568,370
LENS CRIBBER

Filed Nov. 12, 1968     5 Sheets-Sheet 4

INVENTOR.
GUY J. WICKSALL
BY
ATTORNEY

United States Patent Office 3,568,370
Patented Mar. 9, 1971

3,568,370
LENS CRIBBER
Guy J. Wicksall, Fayette, N.Y., assignor to Textron
Inc., Providence, R.I.
Filed Nov. 12, 1968, Ser. No. 774,769
Int. Cl. B24b 9/14
U.S. Cl. 51—127        13 Claims

ABSTRACT OF THE DISCLOSURE

Lens cribbing is effected by engaging the lens blank around successively different portions of its periphery with a rotary annular grinding wheel that has a plane active surface perpendicular to its axis. The blocked lens blank and a template are releasably secured by chucks to opposite ends of the work spindle, which is rotatably journaled in a carrier that is pivotal into and out of an operative position. A flat on the lens block engages a cooperating flat on the lens chuck to assure that the template and blank will be properly aligned angularly about the spindle axis. The template engages a plane-faced shoe, whose upper face lies in the same plane as the active surface of the grinding wheel to effect intermittent indexing of the spindle. After one revolution, the carrier is moved automatically to inoperative position. A cycle pushbutton is actuatable to swing the carrier to its operative position.

---

Finished optical lenses vary in size and shape depending upon the design of the spectacle frames in which they are to be mounted; and it is customary to grind the finished lenses from oversize glass or plastic blanks.

After the blank has been finished on one side, it is blocked and the opposite side of the blank is finished. The surface grinding of a semi-finished blank in accordance with a given prescription may result in the removal of so much glass that the blank becomes extremely thin in the area around the portion of the blank which is to constitute the finished lens; and under the pressure of the finishing operation, this thin section of the lens blank, which is unsupported, may break, shattering the blank and rendering it unusable.

To remove excess glass around the portion of the blank which is to constitute the finished lens, it is customary, therefore, to crib the blank to remove as far as possible most of the surplus glass stock before final finishing and edge-grinding the blank.

Heretofore cribbing has been a hand operation. But hand-cribbing is a slow, tedious operation and does not eliminate breakage. In fact, during hand-cribbing itself the lens blank may be broken or shattered.

A primary object of this invention is to provide a machine which will effect cribbing of a lens blank automatically.

Other, concomittant objects of the invention are to provide a lens cribbing machine which will effect cribbing of lens blanks more easily and in much less time than hand-cribbing operations and which will virtually eliminate the wastage of blanks by breakage.

Another object of the invention is to provide a cribbing machine which will permit cribbing of a lens blank closer to finished size and shape so that the finishing and polishing of a lens can be faster and so that wear and tear on the wheel of the edging machine will be reduced to a minimum.

A further object of this invention is to provide a cribber, which will operate substantially automatically to remove excess material from the edge of a lens blank is conformance with the configuration of a selected template.

A more specific object of this invention is to provide a lens cribber in which the template and lens blank can readily and accurately be chucked for rotation in predetermined angular positions about a common axis.

Other objects of the invention will be apparent hereinafter from the specification and from the recital of the appended claims, particularly when read in conjunction with the accompanying drawings.

Figure 1:
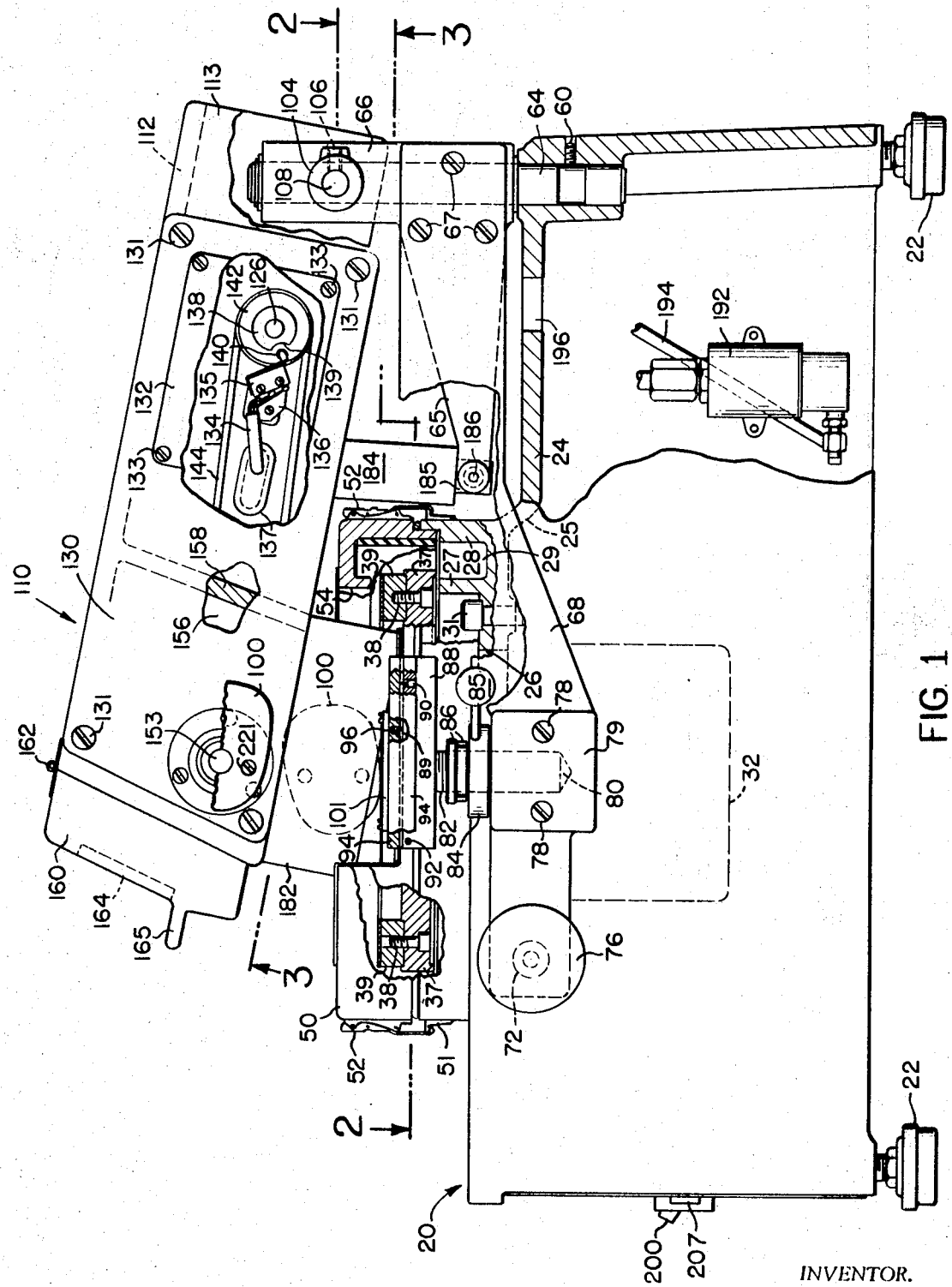
FIG. 1 is a side elevational view of a lens cribber made in accordance with one embodiment of this invention, portions of the cribber being broken away and shown in section.

Referring now to the drawings by numerals of reference, the cribber comprises a hollow base 20, generally rectangular in cross-section (FIGS. 1 and 2), which is supported at its four corners on adjustable feet 22, and which is closed at its upper end by integral, horizontal wall 24. Intermediate its ends wall 24 has a narrow, transverse step portion 25, which is inclined slightly to the vertical, so that the forward portion of wall 24 is vertically offset slightly above its rear portion. Adjacent the front of the base 20 the wall 24 has a circular opening 26 (FIGS. 1 and 2) therein, which is surrounded by spaced flanges 27 and 28 (FIG. 1), that project upwardly from the wall 24 forwardly of the step 25. These flanges define a trough 29 which is drained by a hole 30 (FIG. 2) into a sump which may be in a conventional coolant pumping unit outside the machine.

Secured by a plurality of screws 31 (only one of which is illustrated in FIG. 1) to the underside of wall 24 in registry with the opening 26 is a motor 32 (FIG. 1). Fixed to the shaft 33 (FIG. 2) of motor 32 for rotation thereby is a head 34, to which there is secured by screws 36 (FIG. 2) a ring 37 (FIG. 1). Secured by screws 38 in an annular recess in the upper surface of the ring 37 is an annular, diamond-impregnated grinding wheel 39, which has a plane, upper active grinding surface.

Secured to base 20 by setscrews 41 and 42 (FIG. 2) in operative relation to the grinding wdheel 39, are two nozzles 44 and 45 for direction coolant into the wheel and into trough 29 to keep the trough clear of glass, respectively.

To prevent undue splashing of the coolant as it strikes the rotation grinding wheel 39, and also as a protective means, a guard or cover 50 (FIGS. 1 and 2) is removably secured over flange 28 by a plurality of conventional, releasable clasps or clamps 52, which engage cooperating lugs 51 on the flange 28. Cover guard 50 has therethrough a relatively large opening 54 (FIG. 2), which exposes a portion of the grinding wheel 39 at the right hand side thereof as illustrated in FIG. 2.

Secured by a setscrew 60 (FIG. 1) in a hole in the rear wall of base 20 to project above the base 20 is a post or shaft 64. Mounted on the post 64 for pivotal movement thereabout above base 20 is an arm 65 which is formed with a bearing portion 66 that surrounds the post.

Figure 2:
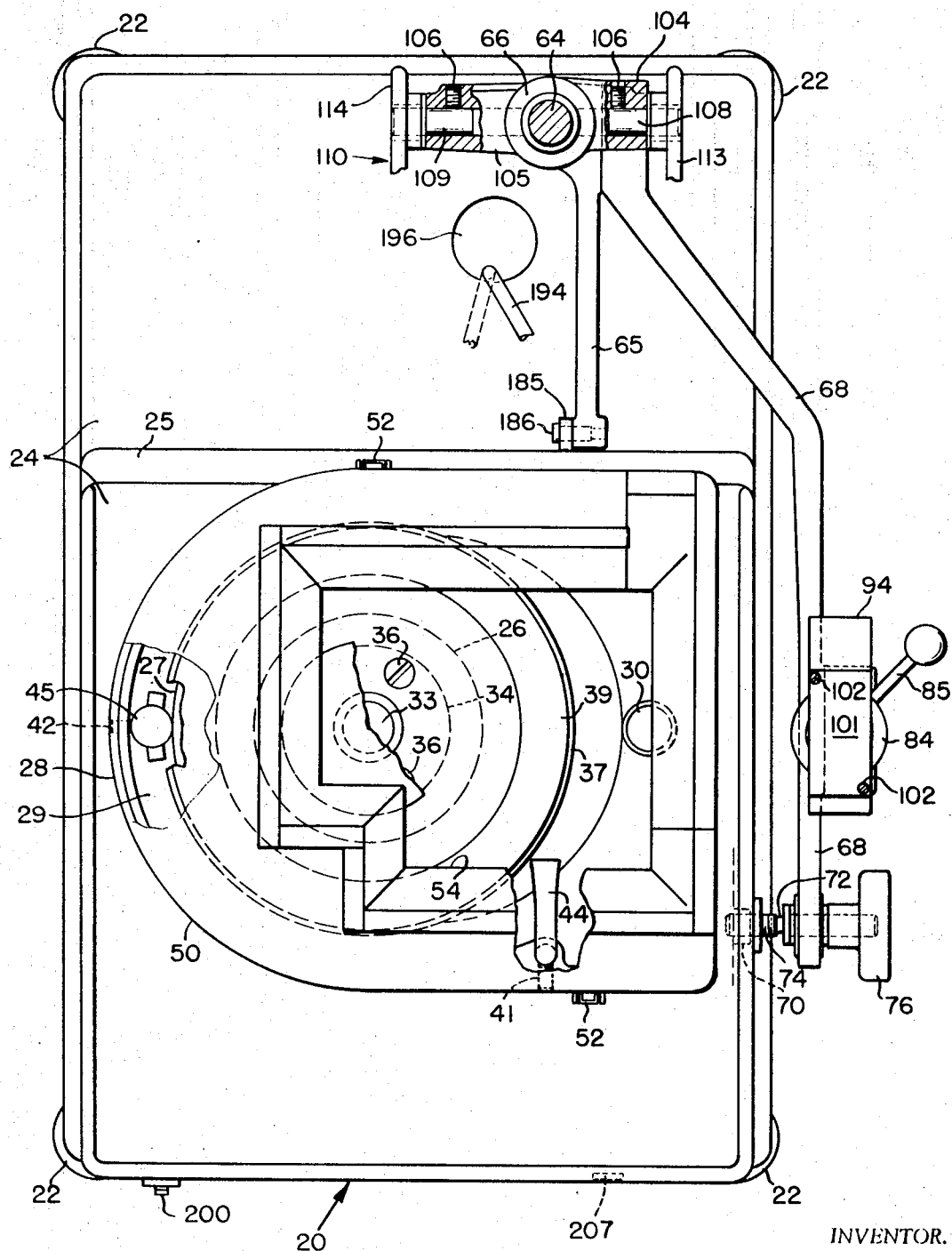
FIG. 2 is a fragmentary sectional view taken along the line 2—2 in FIG. 1 looking in the direction of the arrows.

The bearing portion 66 is flatted off at one side; and secured by screws 67 (FIG. 1) to the flatted portion of the bearing 66 is a second arm 68 (FIGS. 1 and 2). The forward end of arm 68 is offset laterally and downwardly from its rear end, and registers with nut 70 (FIG. 2), which is secured in an opening in the right hand side of the base 20. A stud 72, which is rotatably journaled in the forward end of arm 68, is adjustably threaded as at 74 into the nut 70. The outer end of stud 72 carries a knob 76 by which the stud may be rotated to adjust the position of arm 68 angularly about post 64.

Secured by screws 78 (FIG. 1) to the outside of arm 68 rearwardly of the stud 72 is a block 79. Mounted for vertical adjustment in a bore 80 in block 79 is a stud 82, which may be secured against rotation in any conventional manner. Intermediate its ends stud 82 is externally threaded to receive nut 86 which is adjustable in the stud. A ring 84 surrounds the stud, and it has a stepped cam surface on its lower face (not shown) which engages pins or a corresponding surface (not shown) on stud 80 so that as ring 84 is rotated the stud is raised or lowered, depending on the direction of rotation of the ring. Nut 86 serves to adjust the position of shoe 101 (described below) in relation to ring 84. This is done to compensate for variations in the height of the grinding wheel. A lever 85, which projects radially from the ring 84, is manually operable to rotate ring 84 selectively in opposite directions to adjust shaft 82 vertically.

Secured to the upper end of shaft 82 in a block 88 (FIG. 1). Mounted in a recess in the upper face 89 of block 88 adjacent one end thereof so that its operating arm or plunger normally projects slightly above the block is a conventional, normally-open micro switch 90. Overlying the block 88, and pivotally connected thereto at one end by a pin 92, is an inverted, channel-shaped member 94 (FIGS. 1 and 2). A compression spring 96, which is mounted in the recess in the underside of member 94 between the switch 90 and the pin 92, normally holds the free end of member 94 resiliently in an upper or inoperative position, in which the underside thereof is slightly spaced from the operating plunger of switch 90. A flat shoe 101, which is secured by screws 102 to the top of member 94, is engageable by a former or template 100 on the work spindle of the machine, as described in more detail below, to effect pivotal movement of the member 94 downwardly to close the switch 90.

Figure 3:
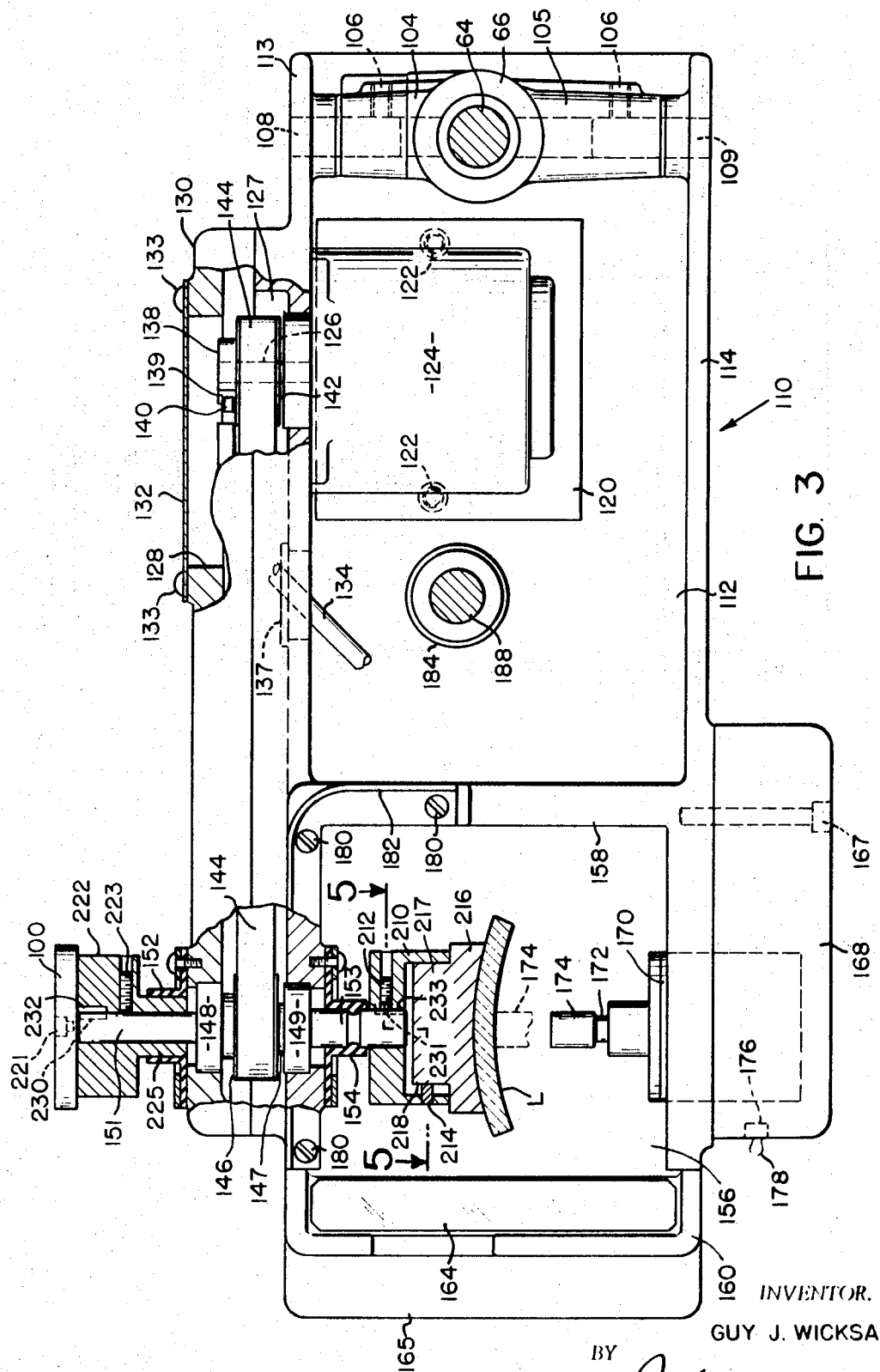
FIG. 3 is an enlarged fragmentary sectional view taken along the line 3—3 in FIG. 1 looking in the direction of the arrows.
Figure 5:
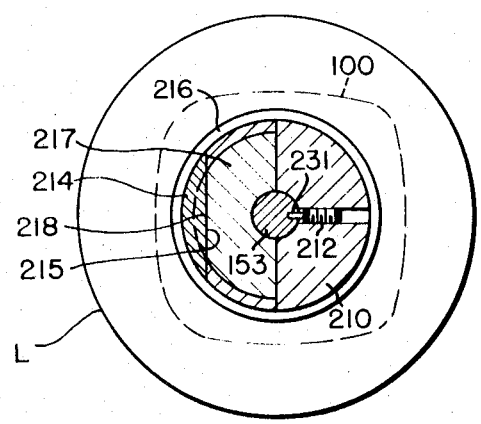
FIG. 5 is a fragmentary sectional view taken along the line 5—5 in FIG. 3 looking in the direction of the arrows.

Projecting radially from opposite sides of the trunnion portion 66, are two, integral coaxial bearings 104 and 105 (FIGS. 1 and 3). Mounted at its rear end for pivotal movement about the common axis of a pair of pins 108 and 109, which are secured by setscrews 106 in the bearings 104 and 105, and for angular movement with the arm 68 about the axis of post 64, is a lens blank carrier 110 (FIGS. 1, 3 and 5). Carrier 110 has an upper wall 112, and downwardly projecting, spaced, parallel side walls 113 and 114. The carrier pivots adjacent its rear end on the pins 108 and 109.

Suspended from a mounting plate 120 (FIG. 3), which is secured to the underside of the upper wall 112 of the housing 110 by studs 122, is an electric motor 124. This motor has a shaft 126 (FIGS. 1 and 3), which projects through an elongate recess 127 in wall 113 into an opening 128 (FIG. 3) in a cover or guard 130, which is secured by screws 131 on the wall 113. A plate 132 (FIGS 1 and 3) is removably secured by screws 133 over the opening 128 to permit access to a limit switch 135 (FIG. 1), which is adjustably mounted inside the wall 133 by a bracket 136. Switch 135 is operated by a cam 138, that is secured to the outer end of shaft 126. The cam 138 has a notch 139 in its periphery for accommodating a roller follower 140 on the operating arm of the switch 135 at predetermined times during the operation of the cribber.

Also secured to the shaft 126 adjacent the cam 138 is a pulley 142 (FIGS. 1 and 3). Pulley 142 is connected by a belt 144 to a pulley 146, which is secured to a spindle 147 that is rotatably journaled intermediate its ends on spaced anti-friction bearings 148 and 149 (FIG. 3), in the wall 113 and cover 130.

To prevent interference with the above-described belt drive from shaft 126, the electrical leads for switch 135 are housed in a conduit 134 that extends into housing 110 through a fitting 137 in wall 113.

Figure 4:
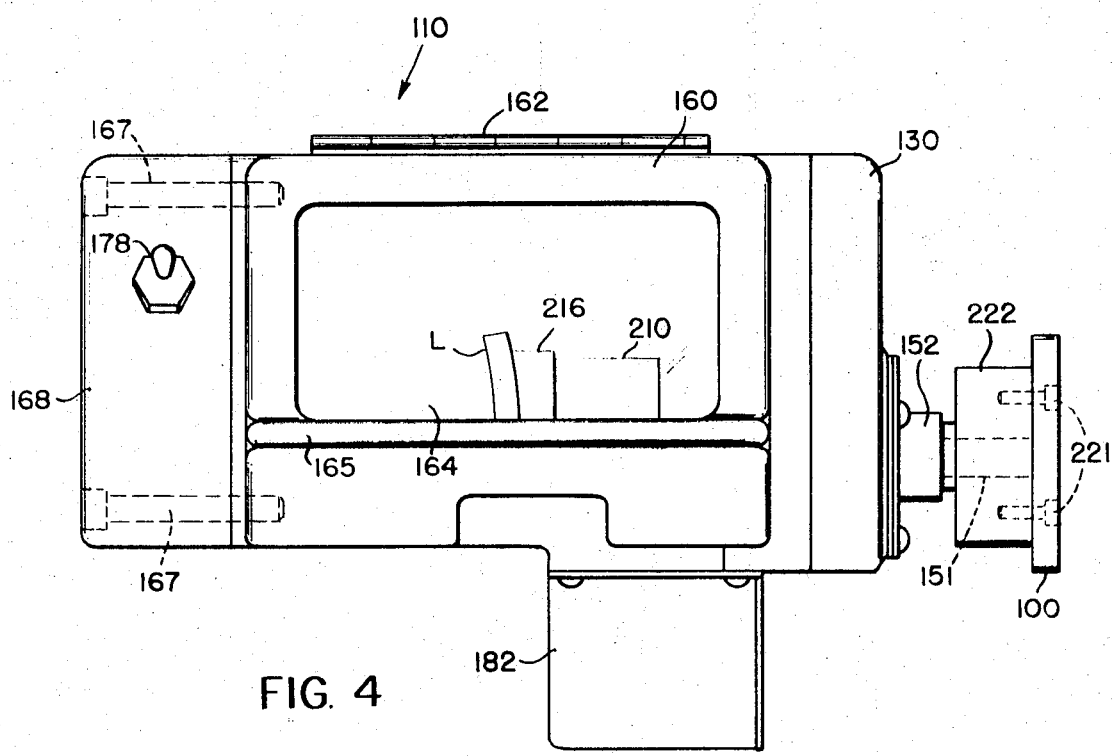
FIG. 4 is a front elevational view of the carrier of the cribber.

At opposite ends, respectively, spindle 147 has reduced-diameter shank portions 151 and 153, which project coaxially through annular seals 152 and 154, which are secured, respectively, to the outside of cover 130, and to the inside of wall 113. The inner end or shank 153 of the spindle projects into a chamber 156 formed in the forward end of housing 110 between a partition 158, and a pivotal cover 160 (FIGS. 1, 3 and 4). Partition 158 extends transversely between the housing walls 113 and 114 rearwardly of the spindle 147. Cover 160 is hinged in conventional manner as at 162 (FIGS. 1 and 4) to the upper, forfward edge of housing 110. A piece of transparent glass or plastic 164, which is secured in an opening in the cover 160, permits the interior of the chamber 156 to be viewed by an operator, when the cover 160 is in its closed position, illustrated in FIG. 1. An integral flange 165 projects from the front of the cover 160 beneath window 164 to provide a grip for manually pivoting the cover between open and closed positions.

Secured by a plurality of screws 167 (FIGS. 3 and 4) to the outside of the housing wall 114 adjacent chamber 156 is a further cover 168. Mounted within cover 168, and projecting through the wall 114 into the chamber 156 is an air cylinder 170. Secured to the outer end of the rod 172 of a piston, that is reciprocable in cylinder 170, to project into the chamber 156 coaxially of the spindle 147, is a cylindrical clamping head 174. A valve 176 for controlling operation of the cylinder 170 is mounted in a recess in the forward face of cover 168. It has a manually operable actuating button 178, that projects from cover 168.

For mounting a lens blank L (FIG. 3) in the cribber, a cup-shaped chuck 210 (FIGS. 3 and 4) is used. This chuck is releasably secured by a setscrew 212 to the inner end or shank 153 of spindle 147, so that the open end of the chuck is disposed in confronting, coaxial relation with the clamping head 174. A segment or key 214 (FIGS. 3 and 5), which is secured in the annular wall portion of chuck 210, projects transversely into the open end of the chuck, and has thereon a flat reference surface 215 (FIG. 5), which lies in a plane that extends chordally across the chuck.

The lens blank L has a lens block 216 molded to it. Block 216 has a reduced diameter shank portion 217, that is adapted to seat releasably in the open end of the chuck 210. At one side thereof this shank portion 217 has thereon a plane, flat reference surface 218 (FIG. 3), which, when the block is properly seated in chuck 210, is disposed in engagement with the flat reference surface 215 on the segment 214, so that the lens blank L, will be held in proper position and against rotation in chuck 210. As a result of the blocking operation, the reference surface 218 on the block 216 is positioned parallel to the horizontal layout reference line (not illustrated) that extends through the optical center of the lens.

To secure the block 216 in the chuck 210, the operator moves the valve 178 (FIGS. 3 and 4) to its ON position, thereby admitting a flow of air to the cylinder 170, to advance piston 172 so that the clamping head 174 is moved axially into engagement with the lens blank L as shown by the broken lines in FIG. 3.

The former or template 100 (FIGS. 1, 3 and 4), which is also shown in phantom by broken lines in FIGS. 1 and 5, is secured by screws 221 to the outer end of a chuck 222, which is fastened by a set-screw 223 on the outer end of the spindle shank 151 coaxially thereof.

At its inner end the chuck 222 has a reduced diameter portion 225 (FIG. 3), which projects into the radial space between the shank 151 and the surrounding seal 152.

The former 100 has a configuration similar to, but larger than, the configuration or outline the finished lens is to have, so that after the cribbing operation enough excess material will remain on the blank to allow for the edge grinding operation, which occurs after surfacing of the blank is finished. The lens blank L, on the other hand, is larger (see FIG. 5) than the former or template 100. The amount of glass, which is to be removed from the lens blank L by the cribbing operation, usually differs slightly at different points around the periphery of the blank, because the lens blank is of different shape than the finished lens which is roughly trapezoidal or ovoid in shape. For example, as shown in FIG. 5, more material must be removed from the corners of the blank than from the top and bottom or side edges thereof, because of the irregular shape of the finished lens. Therefore, it is essential that the blank and the former be properly aligned angularly with respect to one another about the axis of the spindle 147 because the cribbed lens must conform to the shape of the finished lens well enough to leave enough material for the finishing of the lens without leaving excessive amounts of extra glass.

To assure this proper alignment, each shank end 151 and 153 of the spindle 147 may be provided with aligned keys 230 and 231, respectively, which project radially into registering ways or slots 232 and 233 formed in the bores of the chucks 222 and 210, respectively. Consequently, each time a blank is mounted in chuck 210, its horizontal layout line, as represented by the flat 218 on the block, will always be disposed in the same angular position about the axis of spindle 147.

The advantage of this construction is that, when a blank is chucked on spindle 147, it is automatically referenced with respect to its horizontal layout line, rather than with respect to its cylindrical axis, which, unlike the horizontal layout line of a particular shape of lens, may differ from lens to lens, depending upon the prescription for the individual patient. For example, hundreds of spectacle frames of a given design (lens shape) may be sold to a like number of different patients, each of which may require a different cylindrical axis for one or both of the lenses in his or her spectacles. However, the horizontal layout line for each of the several hundred lenses will be the same, so that the angular position of each blank on spindle 147, relative to the template 100, will be the same for each cribbing operation. On the other hand, if each lens blank were to be referenced to its particular cylindrical axis, each blank would have to be angularly adjusted on the shaft 147 before the cribbing operation thereon to compensate for the angular offset of the cylindrical axis from the horizontal layout line of the blank. This adjustment would be time-consuming, and would lead to inaccurate cribbing of the lens.

Secured by screws 180 (FIG. 3) to the undersides of the housing wall 113 and partition 158, and projecting downwardly from the housing 110, is a right angular shield 182 (FIGS. 1 and 3). When the housing 110 is swung downwardly from its inoperative position illustrated in FIG. 1, to its operative position as described below, the shield 182 passes through the opening 54 in the cover guard 50, and extends into the space between the grinding wheel 39 and a notch in the cover 50, to help prevent coolant from splashing out through the notch.

For pivoting the housing 110 between operative and inoperative positions, an air cylinder 184 (FIGS. 1 and 3) is interposed between the housing and the base 20. An ear 185 (FIGS. 1 and 2) on the lower, closed end of cylinder 184 is pivotally connected by a pin 186 to the arm 65 that projects from the bearing 66 forwardly over the base 20 in angularly spaced relation to the arm 68. Cylinder 184 contains an axially reciprocable piston 188 (FIG. 3), which projects from the upper end of the cylinder, and which is pivotally connected in conventional manner to the underside of the upper wall 112 of the housing 110 just rearwardly of the partition 158. Normally the piston 188 is held in its extended position by compressed air supplied to the cylinder 184 through a normally-open solenoid-operated valve 192 (FIG. 1), which is mounted in base 20. To lower the housing, compressed air is released from cylinder 184 by valve 192. Valve 192 is connected to cylinder 184 by flexible tubing 194 (FIG. 1) that extends through an opening 196 formed in the wall 24 of base 20.

Figure 6:
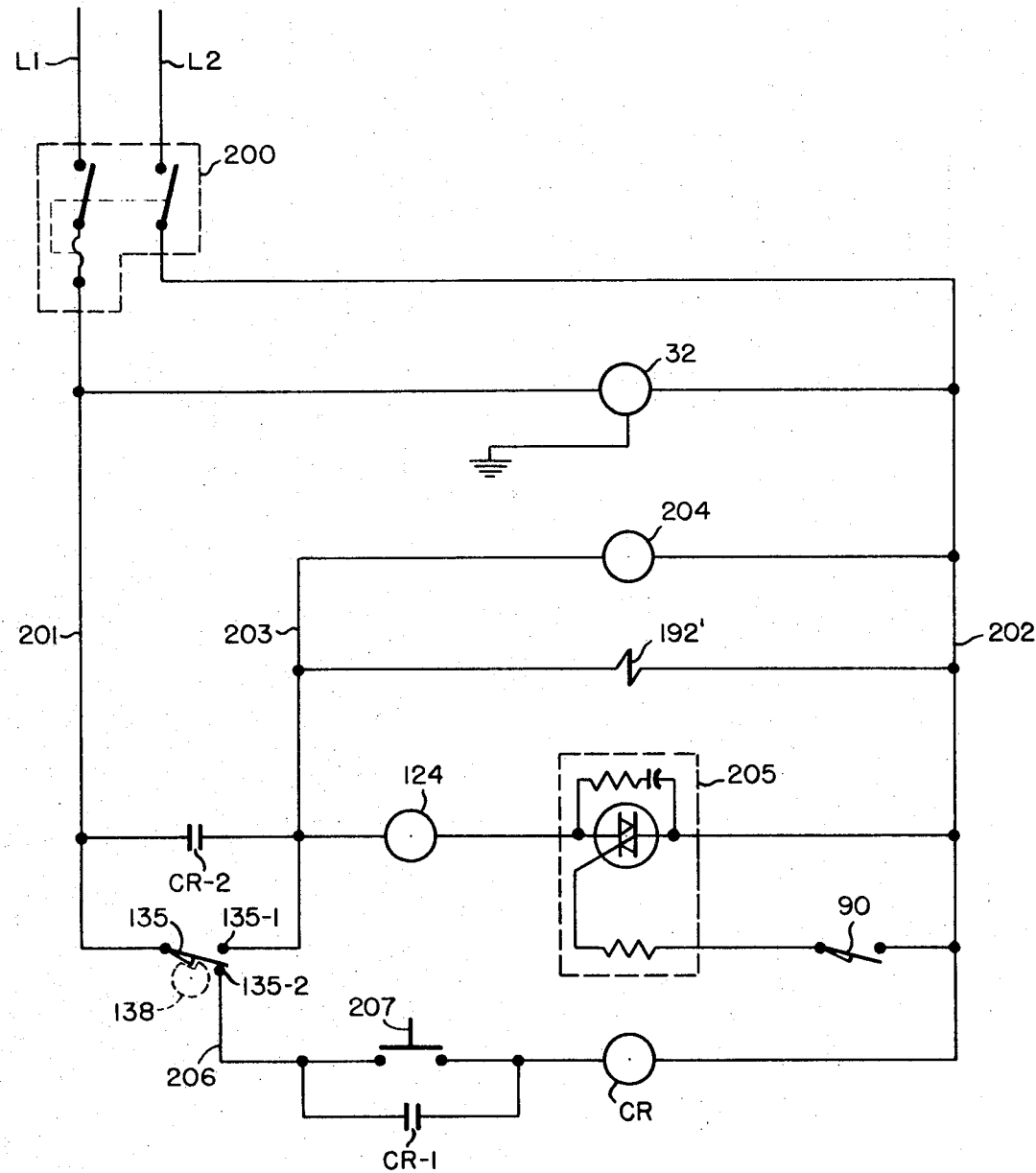
FIG. 6 is a wiring diagram illustrating one manner in which the controls for the cribber may be wired for automatic operation.

One manner in which the machine may be wired to accomplish its purpose is shown in FIG. 6. Here, L1 and L2 denote the main lines from a power source. These are connectable through a conventional two-pole, single-throw ON-OFF switch 200 and lines 201 and 202 to motor 32 so that the motor is energized the moment switch 200 is closed. Connected in parallel between a line 203 and the line 202 is a conventional pump motor 204 which drives a pump for supplying coolant to nozzles 44 and 45 (FIG. 1), and the solenoid 192′, which operates the lift valve 192. Also connected in parallel with the motor 204 and the solenoid 192′, and in series with one another between the lines 203 and 202, is the motor 124, and a conventional solid state switching device 205. The device 205, which normally is in a non-conductive or blocking state, is adapted to be triggered, or rendered conductive, by the closing of the normally-open switch 90, which is connected between a triggering terminal on the device 205 and the line 202.

Power is supplied from line 201 to line 203 selectively through a normally-open relay switch CR-2, or the switch 135. Switch 135 is a two-position switch, which is connected at one side to the line 201, and at its opposite side, selectively, either to a first contact 135-1, on line 203, or to second contact 135-2, on a line 206. Connected in series between the line 206 and the line 202 is a normally-open pushbutton 207, and the relay CR, which controls both the normally-open relay switch CR-2, and a second, normally-open relay switch CR-1, which is connected in parallel with the cycle pushbutton 207.

For convenience, the switches 200 and 207 may be mounted on the front wall of the base 20 (FIGS. 1 and 2) for manual actuation by an operator.

Normally the several switches are in the positions illustrated in FIG. 6. At such time the relay CR is deenergized, so that its switches CR-1 and CR-2 are open. Also, the follower 140 on the operating arm of switch 135 is seated in the notch 139 in the cam 138, so that the switch 135 is engaged with the contact 135-2. However, as soon as the cam 138 begins to rotate, the follower 140 rides up onto the periphery of the cam 138, and in so doing switch 135 away from the contact 135-2, and into engagement with the contact 135-1.

Switch 200 is moved to its closed position prior to grinding, thus energizing motor 32, which begins to rotate grinding wheel 39. It is usually left closed while a number of lenses are run. After the blank L and template 220 have been properly mounted in the carrier or housing 110, the cycle pushbutton 207 is then pushed momentarily to energize the relay CR from line 201 through switch 135, contact 135-2, line 206, switch 207 and the relay to line 202. The now-energized relay closes switches CR-1 and CR-2. Switch CR-1 makes a holding circuit to relay CR which is maintained as long as switch 135 remains engaged with the contact 135-2.

Closing of switch CR-2 closes the circuit to pump motor 204 to pump coolant onto the now-rotating grinding wheel 39. Also at this time valve 192 (FIG. 1) is shifted to permit the carrier 110 to drop downwardly to its operative position under action of gravity to place the edge of the lens blank L in engagement with the grinding wheel 39.

As the blank is lowered, the template or former 100 is lowered also into its operative position, illustrated by broken lines in FIG. 1, wherein its lower edge is held just above the shoe 101 s a result of the excess material on the portion of the lens blank that is then engaged with the grinding wheel 39. As this excess material is ground away, the former 100 is lowered into engagement with the shoe 101. When sufficient material has been removed from the portion of the lens blank then engaged with the grinding segment, the pressure of the former 100 on the shoe 101 causes the switch 90 to be tripped. This triggers the switching device 205, thereby energizing the motor 124.

The rotation of the motor shaft 126 is imparted through the belt 144 and spindle 147 to both the lens blank L and the former 100, so that a new, unground portion of the edge of the lens blank L is indexed into engagement with the grinding segment 39 simultaneously with the movement of a corresponding new portion of former 100 into vertical registry with shoe 101. This new, unground portion of the lens blank tilts the carrier 110 slightly upwardly, thus disengaging the edge of the former 100 from the shoe 101 until the new portion of the blank has been ground to the desired size. At such time, the former 100 will once again engage the shoe 101 with sufficient force to cause the momentary closing of the switch 90 and the consequent indexing of a new portion of the lens blank into contact with the grinding wheel 39.

In this manner the lens blank L and the associated template 100 are indexed intermittently about the axis of the spindle 147 until the cam 138 has completed one full revolution. Then the follower 140 will drop back into the recess 139 to allow the switch 135 to return into engagement with the contact 135–2. At this time switch 207 and the holding switch CR–1 are open, so that the relay CR remains deenergized. Consequently power is removed from the line 203 so that the motor 204, the solenoid 192' and the motor 124 are deenergized.

The now-deenergized solenoid 192' permits the solenoid valve 192 to return to its normal position, thereby pivoting housing 110 upwardly to its inoperative position as shown in FIG. 1.

The cycle is now complete; and the operator may pull the valve 176 to its OFF position to effect the retraction of the clamping head 174, and the consequent release of the blocked lens from the chuck 210. Thereafter a new, unground lens blank L, and if desired, a new template or former 100, may be mounted in the housing 110 before a new cribbing cycle is initiated.

From the foregoing it will be apparent that the instant invention provides a reliable, compact cribber, for rough grinding the edge of a semi-finished lens blank accurately to remove substantial portions of its excess material prior to the surface finishing and final edge grinding of the blank. Normally only one or two templates are used on the machine. This simplifies operation and use of the machine.

By use of the machine described, the final edge grinding operation can be performed more rapidly, and with less wear on the grinder, than previously was possible. Also, by angularly orienting the lens blanks and templates on the spindle 147 in accordance with the horizontal layout line of a lens, as distinguished from the cylindrical axis thereof, the necessity of adjusting each blank on the spindle 147 to compensate for any angular deviation of the cylindrical axis relative to the horizontal layout line, is eliminated. The cribbing operation can thus be performed more rapidly and accurately.

A further advance of the cribber disclosed herein is that the lens blank can be simply and accurately adjusted laterally of the grinding wheel 39 by manual adjustment of the knob 76. This permits the wear on the surface of the grinding wheel 39 to be distributed more evenly across the entire surface thereof, thus eliminating the forming of any undesirable grooves in the grinding surface, and thereby extending the useful life of the wheel. Moreover, by manual adjustment of the rod 85 the shoe 101 may be shifted vertically to maintain its upper surface in a plane of registry with the grinding surface of the wheel. The elevation of this grinding surface may vary from time to time either as a result of excessive use of the wheel 39, or the replacement thereof with a new wheel. The vertical adjustment of shoe 101 also permits the operator either to increase or decrease the amount of excess material that is to be removed from the edge of a respective blank.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A cribber for blocked lens blanks, comprising a base,
a rotatable grinding wheel in said base,
a member pivotally mounted on said base to swing about a second axis parallel to the axis of rotation of said wheel,
a carrier pivotally mounted on said member for movement therewith, and for pivotal movement between operative and inoperative positions about a third axis that extends transverse to said second axis,
means for mounting a lens blank on said carrier for rotation about a fourth axis parallel to said third axis and for pivotal movement with said carrier into and out of engagement with said wheel upon corresponding movements of said carrier into its operative and inoperative positions, respectively, and
drive means actuatable intermittently to index said blank about said fourth axis, when said carrier is in its operative position, thereby to advance successive portions of the edge of the blank into contact with said wheel.

2. A cribber as defined in claim 1, including
carrier operating means interposed between said base and said carrier normally to hold said carrier in its inoperative position, and actuatable to move said carrier to its operative position, and
control means for actuating said carrier operating means, and for retaining said carrier in its operative position until said blank has been indexed one revolution about said fourth axis.

3. A scribber as defined in claim 2, including
a template having a configuration corresponding to the shape to which said blank is to be ground,
means for mounting said template on said carrier to be indexed with said blank about said fourth axis,
a sensing member mounted on said pivotal member for engagement intermittently by successive portions of the edge of said template during the indexing of said blank and template, and
means for actuating said drive means, when said sensing member is engaged by said template.

4. A cribber as defined in claim 3, wherein
said carrier operating means is electrically operated, and
said control means comprises a first switch operable manually to actuate said carrier operating means, and a second switch operative to maintain said carrier operating means actuated during the indexing of said blank and template.

5. A cribber as defined in claim 4, wherein
said drive means comprises an electric motor, and
said means for actuating said drive means comprises a third switch in circuit with said motor, and operative to energize said motor through one of said first and second switches, respectively, when said sensing member is engaged by said template, and to deenergize said motor, when sensing member and template are disengaged.

6. A cribber as defined in claim 3, wherein the mounting means for said lens blank and said template comprises
   a spindle mounted in said carrier for rotation by said drive means about said fourth axis and to one end of which the blank is secured and to the other end of which said template is secured, and
   the means for securing the blank to said spindle comprises a chuck releasably secured to said spindle adjacent said one end thereof, and having therein an axial bore for housing one end of a lens block that is secured to said blank,
   said chuck having thereon a locating element, which projects transversely into said bore to engage and locate said block in a predetermined angular position relative to the axis of said spindle.

7. A cribber as defined in claim 6, wherein said element has thereon a flat reference surface, which extends chordally of said bore, and which is engageable with a corresponding flat on said one end of said block.

8. A cribber as defined in claim 6, wherein the means for securing said template to said spindle comprises
   a second chuck secured to said spindle adjacent the other end thereof,
   means releasably securing said template in a predetermined position on said second chuck for rotation thereby, and
   cooperating locating means on said spindle and chucks, respectively, operative to align said chucks in predetermined angular positions on said spindle.

9. A cribber as defined in claim 1, including means interposed between said member and said base and manually operable to adjust said member angularly about said second axis to shift said blank radially of said wheel.

10. A cribber as defined in claim 2, including means responsive to the actuation of said carrier operating means to direct liquid coolant onto said grinding wheel.

11. A cribber for edge grinding blocked lens blanks, comprising
    a base,
    a grinding wheel mounted in said base to rotate about a first axis,
    a carrier mounted adjacent one end thereof on said base for pivotal movement about a second axis parallel to said first axis, and about a third axis that extends transverse to said first and second axes,
    a spindle mounted in said carrier adjacent the opposite end thereof for rotation about a fourth axis parallel to said third axis,
    a motor having a shaft drivingly connected to said spindle to rotate the latter, when the motor is energized,
    means for mounting a blocked lens blank on said spindle adjacent one end thereof for movement with said carrier,
    carrier operating means normally holding said carrier in an inoperative position in which a blank carried thereby is spaced from said wheel, and actuatable to swing said carrier about said third axis to an operative position in which the edge of the blank carried thereby is engaged with said wheel,
    means operative to energize said motor intermittently each time said carrier is moved with a lens blank to its operative position, thereby to advance successive portions of the edge of the last-name blank into contact with said wheel, and
    control means for actuating said carrier operating means, including
    means responsive to the operation of said motor automatically to effect the return of said carrier to its inoperative position at the completion of each revolution of said spindle.

12. A cribber as defined in claim 11, wherein said control means comprises
    a first switch movable momentarily from an open to a closed position to actuate said carrier operating means,
    a second switch normally disposed in a first position when said first switch is closed, and movable to a second position to maintain said carrier in its operative position after said first switch has opened, and
    a cam drivingly connected to the shaft of said motor, and operative to hold said second switch in its second position during each revolution of said spindle, and operative to allow said second switch to return to said first position after each revolution of said spindle.

13. A cribber as defined in claim 11, including
    a template mounted on said spindle adjacent the opposite end thereof, and having a configuration corresponding to the shape to which a blank is to be ground, and wherein
    said means for intermittently energizing said motor comprises a normally-open switch in circuit with said motor normally to deenergize said motor, and positioned to be closed momentarily by said template each time the desired amount of material has been ground from the portion of the blank then engaged with said wheel.

References Cited

UNITED STATES PATENTS

| | | | |
|---|---|---|---|
| 2,651,890 | 9/1953 | Rubinstein | 51—101 |
| 2,674,068 | 4/1954 | Eves et al. | 51—101 |
| 2,685,153 | 8/1954 | Ellis | 51—101X |
| 2,693,063 | 11/1954 | Dillon | 51—127 |
| 2,725,689 | 12/1955 | Dexter | 51—101 |
| 3,011,291 | 12/1961 | Walton et al. | 51—127 |
| 3,461,619 | 8/1969 | Hurlbut et al. | 51—127 |

LESTER M. SWINGLE, Primary Examiner